United States Patent [19]

Smethwick et al.

[11] Patent Number: 5,145,307
[45] Date of Patent: Sep. 8, 1992

[54] CARGO VEHICLE

[75] Inventors: Edward P. Smethwick, Wilmington; James D. Smith, Fairborn; Joseph C. Martin, Oregonia; Thomas R. Ross, Sabina, all of Ohio

[73] Assignee: Airborne Express, Inc., Wilmington, Ohio

[21] Appl. No.: 634,569

[22] Filed: Dec. 27, 1990

[51] Int. Cl.5 .............................................. B60P 1/02
[52] U.S. Cl. .................................... 414/458; 414/471; 414/476; 414/495; 280/418.1; 280/43.24; 410/69
[58] Field of Search ............... 414/458, 459, 471, 474, 414/475, 476, 481, 495; 410/69, 71, 94, 156; 280/418.1, 43.24

[56] References Cited

U.S. PATENT DOCUMENTS

| | | |
|---|---|---|
| 2,538,531 | 1/1951 | Likens . |
| 2,639,450 | 5/1953 | Ramer . |
| 2,835,502 | 5/1958 | Willetts . |
| 2,904,802 | 9/1959 | Hartman . |
| 2,912,253 | 11/1959 | Harris et al. . |
| 2,974,972 | 3/1961 | Hassel ........................ 414/471 X |
| 3,156,484 | 11/1964 | Talbert ........................ 414/458 X |
| 3,172,218 | 3/1965 | Constantin . |
| 3,233,767 | 2/1966 | Goodacre . |
| 3,257,145 | 6/1966 | Case et al. . |
| 3,795,333 | 3/1974 | Tebben ............................ 14/71 X |
| 3,795,336 | 3/1974 | Acker ........................... 280/43.23 |
| 3,933,101 | 1/1976 | Blas ................................... 410/69 |
| 3,986,460 | 10/1976 | Voigt et al. ...................... 410/69 |
| 4,063,745 | 12/1977 | Olson ............................ 280/43.23 |
| 4,083,573 | 4/1978 | Baxter ........................ 414/471 X |
| 4,349,302 | 9/1982 | Ferguson, Jr. .................. 410/69 |
| 4,443,905 | 4/1984 | Kopp ............................... 14/69.5 |
| 4,452,555 | 6/1984 | Calabro ...................... 414/458 X |
| 4,484,846 | 11/1984 | Engel et al. .................. 410/94 X |
| 4,488,326 | 12/1984 | Cherry ........................... 14/72.5 |
| 4,500,248 | 2/1985 | Kramer .......................... 414/459 |
| 4,517,698 | 5/1985 | Lamp'l et al. ................. 14/72.5 |
| 4,836,736 | 6/1989 | Neagu ............................ 414/557 |
| 5,006,031 | 4/1991 | Fossing et al. ............. 414/495 X |
| 5,018,930 | 5/1991 | Hardin et al. ................. 414/458 |

Primary Examiner—Robert J. Spar
Assistant Examiner—James Keenan
Attorney, Agent, or Firm—Vorys, Sater, Seymour & Pease

[57] ABSTRACT

There is disclosed a cargo vehicle which includes a cargo carrying surface which is elevatable between a ground engaging or loading position and an elevated or transporting position. Also disclosed is a releasable cargo retaining mechanism for use in conjunction with the cargo carrying surface for releasably retaining the cargo on such surface.

7 Claims, 5 Drawing Sheets

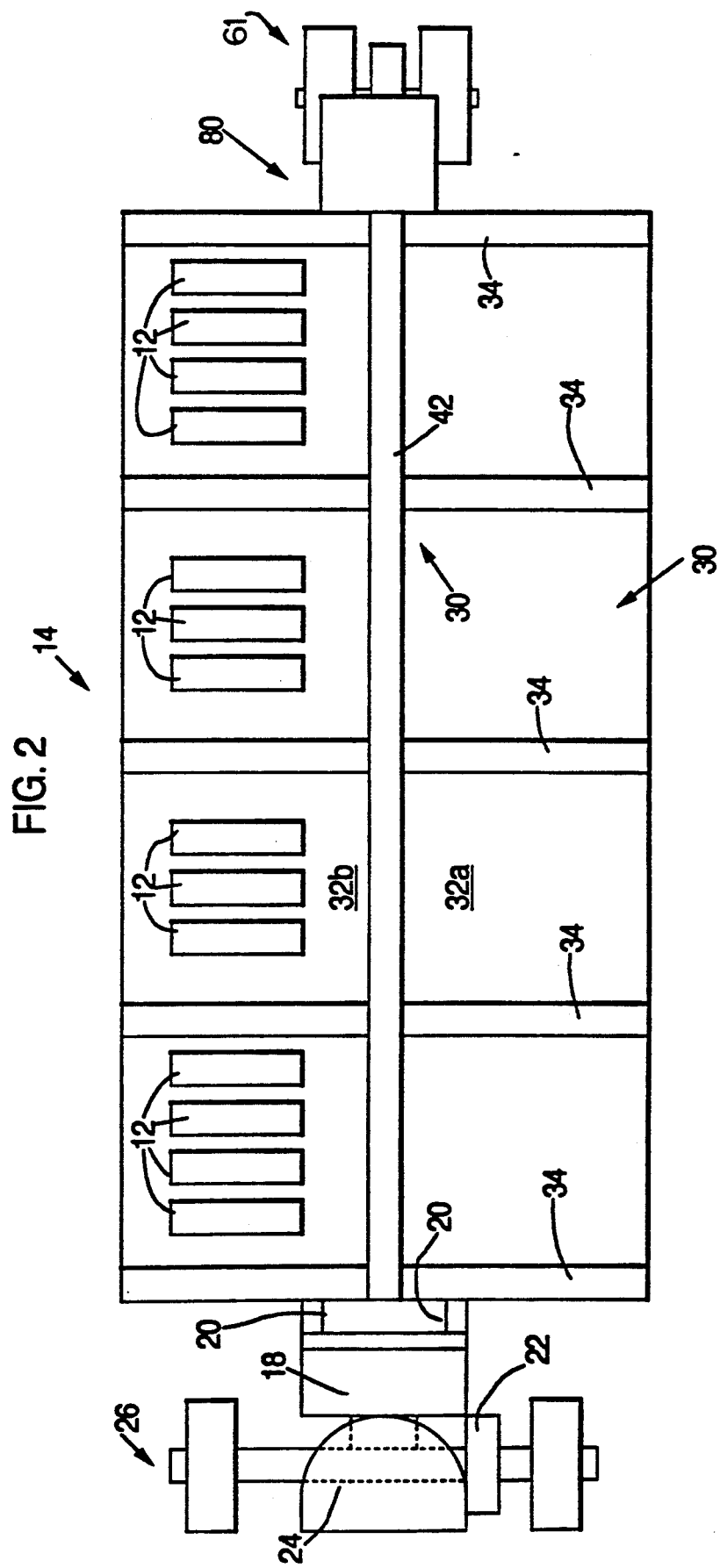

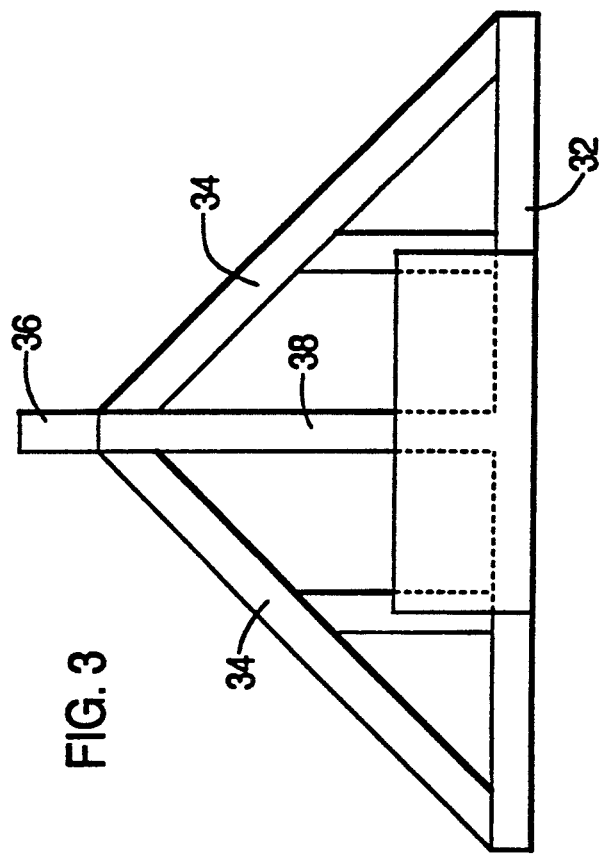
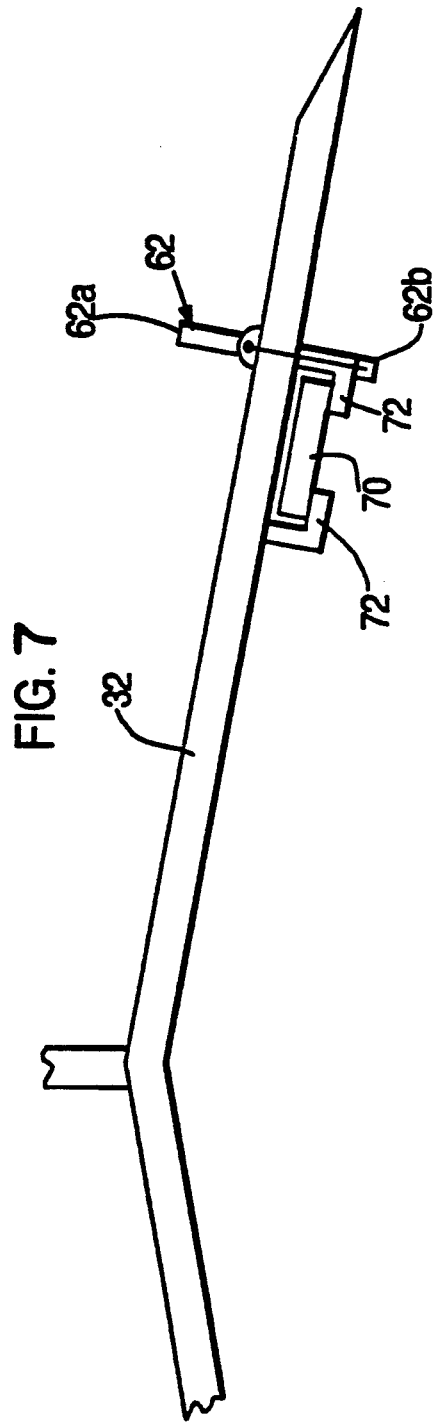

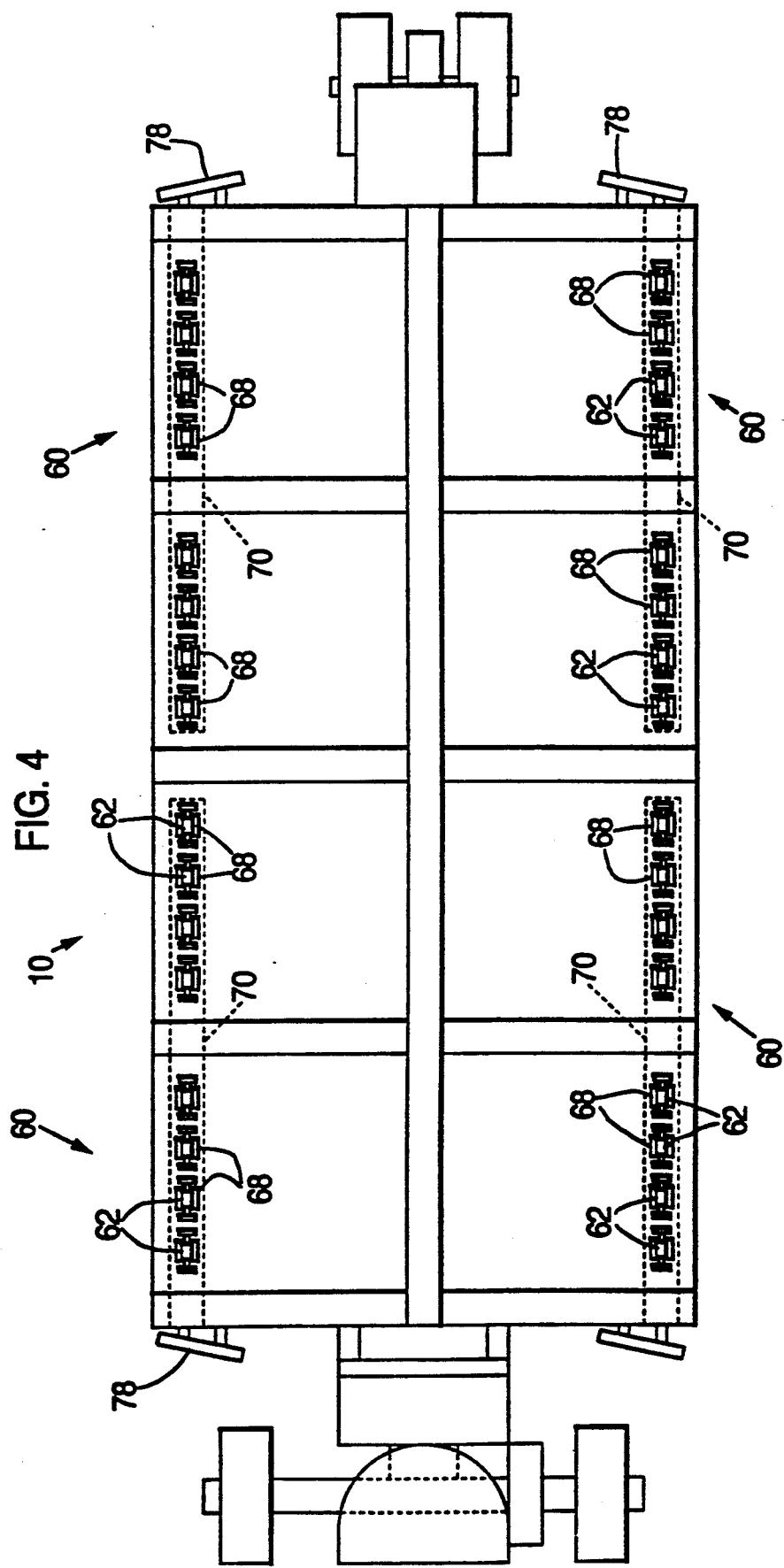

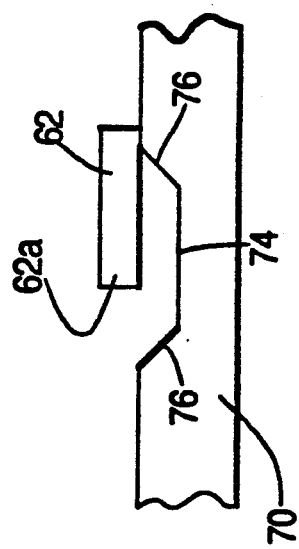
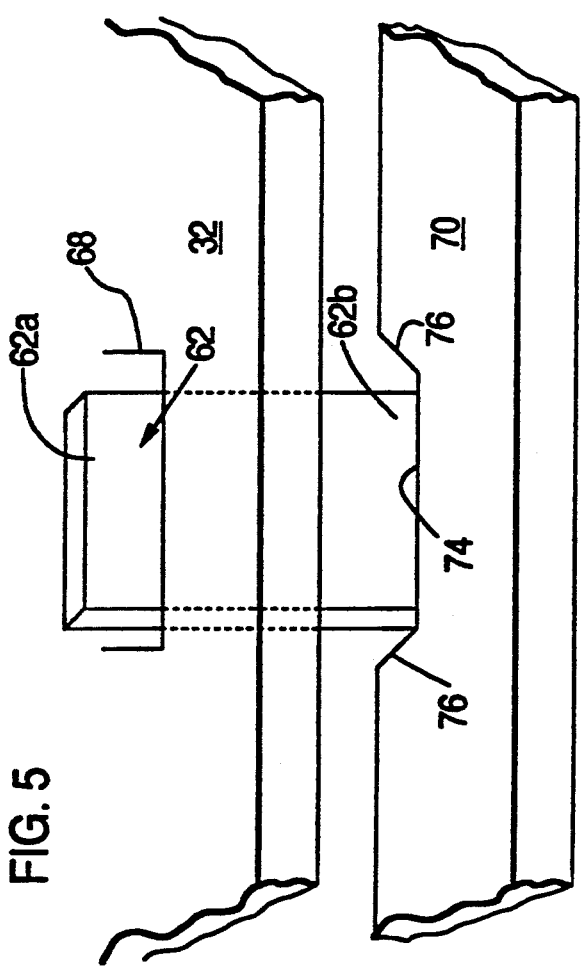
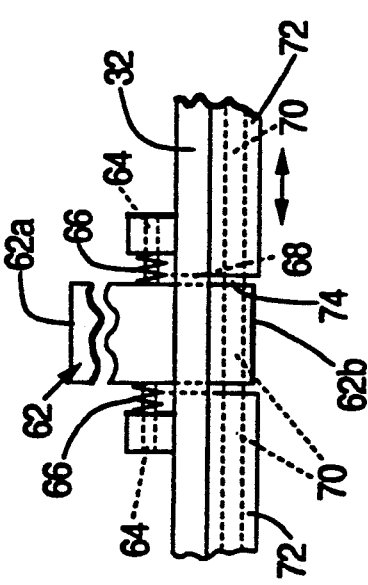

CARGO VEHICLE

BACKGROUND OF THE INVENTION

The present invention is related to cargo vehicles add, more particularly, to cargo vehicles which are adapted to facilitate loading and unloading of cargo thereonto and therefrom as well as support the same for transportation.

Air cargo loading and unloading from an airplane and transportation of such cargo to a terminal or the like typically utilizes a trailer or cart. The cargo is manually loaded onto and removed from such trailers. In the air cargo transportation business, large, cumbersome and heavy containers are frequently used for storing cargo. Ordinarily, such a trailer is towed by a tractor. The trailer includes a frame structure which has a mounting structure, wherein the cargo containers are lifted onto and removed therefrom. Because of the weight and shape of such containers, considerable lifting effort is expended by workers during the loading and unloading procedure.

Also, in the prior art there are several types of cargo vehicles which facilitate loading and unloading of containers and the like. Some of these trailers are provided with pivoted loading plates or ramps which allow sliding movement of the containers relative thereto. While this approach is successful in reducing the work involved in handling the containers there are, nevertheless, drawbacks associated therewith. For example, some cargo containers are not easily slidable or movable on ramps. Besides, considerable worker effort in lifting is still required, despite the ramp. Then, of course, considerable time is expended as well.

Other types of cargo carrying devices rely upon a loading platform which is elevatable to adjust for different loading/unloading heights. Exemplary patents illustrating apparatus of the foregoing type are described in U.S. Pat. Nos. 2,835,502; 3,795,336 and 4,063,745. Such apparatus, however, tend to be relatively complicated in construction. Accordingly, there is ongoing interest in providing for improvement in apparatus which simplifies the loading and unloading of cargo. Moreover, there is interest in providing improved mechanisms for releasably retaining carried cargo on such vehicles.

SUMMARY OF THE INVENTION

It is an object of the present invention to overcome the drawbacks of the prior art as well to provide an improved cargo type vehicle which facilitates the loading and unloading of containers therefrom, as well as the transportation of the same.

According to the present invention, there is provided a wheeled cargo vehicle for facilitating the loading and unloading of cargo containers and the like from one location to another location. Included in the apparatus is a movable chassis assembly which is coupled with a wheeled assembly means including lifting means for moving said chassis assembly. The movable chassis assembly is arranged to support a plurality of containers for transportation between the noted locations. The movable chassis assembly means is operable by the lifting means for selective movement between at least a lower or ground engaging position at which the containers are easily loaded/unloaded, and an upper or transporting position which is elevated from the ground. The wheeled frame assembly includes at least a first wheel mechanism located at a forward end of the cargo vehicle. A second wheel mechanism is located at an opposite or rearward end of the vehicle and is coupled to the chassis assembly. Provision is made for an attaching means being associated with the wheeled chassis assembly for allowing attachment of the vehicle to a towing vehicle. Pivotally attached to the movable container mounting assembly means and to the second wheel mechanism is a first means which is operable for allowing movement of the chassis assembly between the upper transporting position and the ground engaging position when operated by lift means on the frame assembly. As a result, the containers can be easily loaded onto and unloaded from the container mounting assembly when in the ground engaging position and then transported when in the upper transporting position by locking the containers in place using an automatic spring loaded flipper and slide lock/release mechanism.

In an illustrated embodiment, the chassis assembly is defined by an open-sided truss structure which is accessible from both longitudinal sides thereof. The chassis assembly includes a generally horizontal container supporting surface upon which the containers are supported.

Among the other objects and features of the present invention are the provision of an improved cargo vehicle assembly; the provision of an improved cargo vehicle which has a cargo supporting surface which is elevatable between ground engaging and transportation positions; the provision of an improved cargo vehicle which includes a sturdy truss structure support carriage providing sufficient strength to carry significant cargo loads; the provision of an improved cargo vehicle of the above-noted type which includes structure providing for a simplified and reliable manner when raising and lowering the load carrying surface of the vehicle; the provision of a cargo vehicle of the foregoing type which is simply constructed and easily operated; and the provision of a cargo vehicle of the foregoing type which includes a spring-loaded flipper and slide lock-/cargo containing release mechanism.

Still other objects and further scope of applicability of the present invention will become apparent from a detailed description to follow when taken in conjunction with the accompanying drawings in which like parts are designated by like reference numerals throughout the several views.

BRIEF DESCRIPTION OF THE DRAWINGS

FIG. 2 is a schematic plan view of the cargo vehicle;

FIG. 3 is an end view of one end of the cargo vehicle chassis;

FIG. 4 is a schematic planar view of the location of automatic locking and release mechanism showing another embodiment of the present invention;

FIG. 5 is a perspective and fragmented schematic view of certain components of the locking and release mechanism depicted in FIG. 4 shown in an unlocking condition;

FIG. 5A is a fragmented schematic of the locking and release mechanism in the locked condition;

FIG. 6 is a fragmented and elevational view of the locking and release mechanism as depicted in FIG. 5; and FIG. 7 is an end view of the locking and release mechanism.

DETAILED DESCRIPTION

Figure 1:
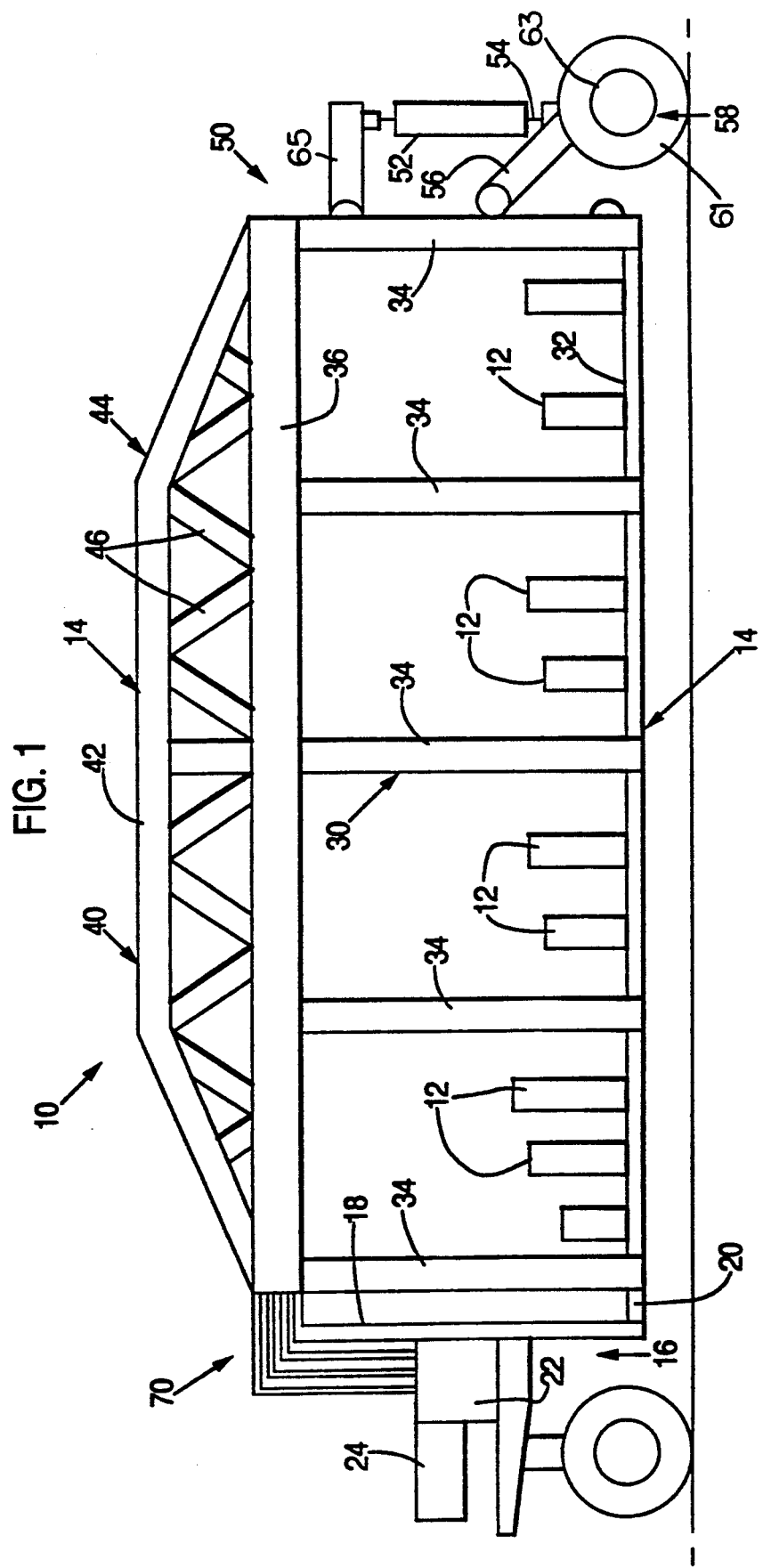
FIG. 1 is a schematic elevational view of one preferred embodiment of a cargo vehicle made according to the present invention.

Referring now to the drawings and, in particular, to FIGS. 1-3, there is disclosed one preferred embodiment of a cargo vehicle 10 made according to the present invention. In this embodiment, the cargo vehicle 10 is adapted to facilitate the on-loading and off-loading of air cargo containers 12 as well as the transportation of the same. The air cargo containers 12 anticipated for use with the vehicle 10 are heavy and somewhat bulky.

The cargo vehicle 10 is constructed so that the elevation of the containers 12 can be adjusted between a loading/unloading condition or mode and a transporting condition or mode. The cargo vehicle 10 is adapted to be transported between, for instance, an airplane and a suitable cargo loading dock or platform located at a cargo depot. It will be appreciated that when the cargo vehicle 10 is in a lower or ground engaging position, the cargo containers 12 can be easily manually placed thereon and removed therefrom. Since the vehicle is in a ground engaging position considerably less work effort is needed for the loading/unloading operation. Subsequent to the loading/unloading operation, the cargo vehicle 10 is elevated sufficiently so that the vehicle can transport the containers 12.

As illustrated, the cargo vehicle 10 includes a chassis assembly 14 which is vertically movable relative to a stationary fork-lift mechanism 16. The chassis assembly 14 is to be raised and lowered between the noted ground engaging and elevated transportation positions by operation of the fork-lift mechanism 16.

In the illustrated embodiment, the fork-lift mechanism 16 is an industrial straddle type of fork-lift device which is operable for lifting, lowering and moving loads. The straddle type of fork-lift mechanism 16 includes a vertical mast 18 upon which straddle lifts 20 are vertically slidably movable. The straddle lifts 20 are directly connected by suitable means (not shown) to the vertically movable chassis assembly 14 to facilitate the raising and lowering of the latter. Since the fork-lift mechanism 16 is generally well-known, details of its construction and operation have been omitted. In this embodiment, however, the straddle lifts 20 are raised and lowered in response to actuation of a hydraulic motor (not shown), the latter of which is operated by a known type of hydraulic control mechanism generally noted by reference numeral 22. Although the control mechanism is shown in this arrangement, it need not be, but can be in any suitable position. When operated the hydraulic motor raises and lowers the lifts 20. A fifth wheel mechanism 24 is connected to the fork-lift mechanism 16, the latter of which supports a front axle wheel assembly 26. In a known manner, the fifth wheel mechanism 24 is connected to a suitable towing vehicle (not shown) for towing the cargo vehicle 10. Other attaching devices for towing can be used.

Reference is now made to the chassis assembly 14, which essentially serves as a loading platform that is generally horizontal and is sized and constructed to support, store and transport the noted cargo containers 12. The chassis assembly 14 is seen to include a framework 30 that essentially comprises upright columns and horizontal members for supporting the container loads and for providing stability. More specifically, the framework 30 comprises a generally horizontal container supporting structure or loading platform 32 that has opposed longitudinal portions 32 a, b, preferably slanted downwardly from a longitudinal axis thereof. A plurality of vertical and angled supporting members 34 (as shown in FIG. 2) bridge one longitudinal edge of the loading platform 32 to the opposite longitudinal edge. The vertical supporting members 34 are interconnected by a longitudinally extending stiffening or I-beam member 36 so as to provide rigidity and stability for the framework 30. The stiffening beam member 36 interconnects the apex of each supporting member 34. Opposite ends of the beam 36 are coupled suitably to upright central supports 38 (one of which is shown in FIG. 3) associated with the end-most container supporting member. A truss arrangement 40 is provided over the horizontal beam 36 and includes an upper truss type chord member 42 and a truss web system 44 including a plurality of diagonal members 46 between the upper chord beam 42 and the horizontal beam 36. It will be noted that the present invention can include a variety of other framework structures to provide the strength and rigidity for carrying a plurality of the cargo containers 12.

Towards the end of adjusting the elevational position of the chassis assembly 14, there is provided an elevational adjusting assembly 50. The elevational assembly 50 is operable for facilitating lifting and lowering of the chassis assembly 14. The elevational adjusting assembly 50 includes a hydraulic motor assembly 52 that has a cylinder 52 and a piston rod 54 which is extendible and retractable upon energization of the hydraulic motor assembly 52. Although this particular embodiment discloses a single hydraulic motor for purposes of accomplishing the foregoing, it will be appreciated that several can be utilized as well. Moreover, the present invention envisions other suitable devices for purposes of moving the rear axle mechanism for purposes of raising and lowering the chassis assembly. The free end of the piston rod 54 is coupled to a pivoting arm member 56 that has one end thereof pivotally connected to a rear axle mechanism 58. The rear axle mechanism 58 includes a pair of wheel 61 supported on the rear axle 63. The truss assembly 40 includes a rearwardly extending supporting arm 65 which is arranged so as to have connected thereto in a generally vertical relationship the hydraulic cylinder assembly 52 which has its piston rod 54 connected to the pivoting arm member 56.

When the piston rod 54 is retracted, it pulls upwardly on the second wheeled mechanism 58, whereby the pivoting arm member 56 swings outwardly and upwardly, as viewed in the drawings, relative to the chassis assembly 14. Simultaneously, the fork-lift mechanism 16 lowers the opposite end of the loading platform 32 to the ground engaging position. As a result, the chassis assembly 14 can be lowered to the ground engaging position, whereupon the cargo containers 12 can be loaded/unloaded. Once it is desired to raise the loading platform 32 to the transporting position, the reverse of the foregoing procedure is initiated. Accordingly, the fork-lift mechanism 16 is operated to raise the chassis assembly 14 while the hydraulic motor is operated so as to extend the piston rod 54. Such extension is effective to swing the pivot arm 56 inwardly and downwardly, as viewed in the drawings, relative to the chassis assembly 14. The hydraulic force provided by the cylinder assembly 52 is sufficient for purposes of retaining the rear axle mechanism in the position, as shown in the drawings, so as to enable transportation of the cargo containers 12. Thereafter, a towing vehicle is connected to the fifth wheel mechanism for towing the loaded cargo vehicle 10. It will be appreciated that by virtue of the foregoing structure a wide variety of cargo can be lifted, lowered and transported with a device which is simple in construction and operation.

After having described the structure of the present embodiment, it is believed that the operation thereof is self-evident. To supplement such description, however, it will be appreciated that when the cargo vehicle 10 is moved to a loading situation, for example, adjacent an airplane, the loading platform 32 will be in its ground engaging condition. This facilitates the loading of the heavy cargo containers 12. Upon a completion of the loading operation, a hydraulic control mechanism 22 which includes suitable fluid tubing generally indicated at 70 (FIG. 1) is operated by a vehicle operator for purposes of energizing the hydraulic cylinder assembly 52 as well as for raising the fork-lift 16 by its hydraulic cylinder. The fork-lift 16 will be effective for lifting the forward end of the chassis assembly 14, whereas the hydraulic cylinder assembly 52 retracts the piston rod 54 to urge the pivoting arm 56 toward the chassis assembly. As a result, the rear axle mechanism will swing or move towards the chassis assembly 14. The combination of the lift fork and the aforenoted motion of the rear axle mechanism provide a means by which the loading platform 32 is elevated. The hydraulic force locks the rear axle mechanism in the desired transporting position, whereby the loading platform is elevated from the ground.

Accordingly, the cargo vehicle 10 can be transported from the airplane to an unloading dock. At the unloading dock, the hydraulic cylinder assembly 52 is energized so as to retract the piston rod 54 and thereby allow the pivotal arm 56 to move outwardly. Simultaneously, the fork-lift 16 is operated to lower the forward end of the loading platform 32. The simultaneous occurrence of these two actions permit the controlled downward movement of the loading platform 32 until the latter contacts the ground. In such position, of course, the loaded cargo containers 12 can be effectively and easily removed by releasing the container locking device.

Reference is now made to FIGS. 4-7 for showing another embodiment of the present invention. In this particular embodiment, the cargo vehicle 10 is provided with a plurality of cargo container locking and releasing assemblies designated generally by reference numeral 60. As depicted in FIG. 4, for instance, each of the locking and releasing assemblies 60 is operatively associated with a longitudinal edge portion of the loading platform 32. Each of the locking and releasing assemblies 60 includes a plurality of pivotally mounted flapper members 62 having a generally elongated and rectangular shape. Each of the flapper members 62 is mounted on a pair of pivot shafts 64 extending from suitable pivot mountings on the top surface of the loading platform 32 as best seen in FIG. 6. A torsion spring 66 is mounted on each of the pivot shafts 64 and is connected to the flapper 62 so as to bias the latter in a generally vertical position, whereby they extend vertically through suitable platform openings 68. The platform openings 68 are sized to allow either ends of the flapper 62 to extend or rotate therethrough. A longitudinally extending slide locking member 70 is mounted from the bottom side of the supporting platform 32 by longitudinally extending mounting brackets 72 (FIG. 7) for slidable and reciprocable motion between an unlocking position (FIGS. 5 and 6) and a locking position (FIG. 5A).

As seen in FIGS. 5 and 6, the slide locking member 70 includes a plurality of recesses 74 for each of the flappers 62. Each recess 74 is formed so as to permit rotational movement of the flapper 62 therepast. It will be appreciated that a portion 62a of the flapper 62 protruding above the loading platform 32 is designed to engage as well as retain the cargo containers (not shown). Loading of the containers onto the cargo platform or supporting platform 32 is done by having the containers strike the upper portion 62a of the flapper and thereby cause it to pivot inwardly toward the longitudinal center of the supporting platform 32. The torsion springs 66 for each of the flappers serve to return the flapper 62 to its upright position automatically. For purposes of locking the flapper 62 in the locking position, such as during transport of the cargo containers, the slide locking member 70 is moved, leftwardly, as viewed in FIGS. 5 and 6, so that camming surface 76, which forms part of the recess 74, will engage a vertical side of the flapper 62 and thereby cause the same to pivot upwardly allowing the flapper 62 to rest against the straight flat edge of the locking member 70 as indicated in FIG. 5A. As noted, FIG. 5A represents the locking and releasing mechanism in the locked position. In this manner, the flapper 62 cannot be rotated by virtue of the interference provided by the locking slide member 70. This positive interlocking arrangement allows the flappers to retain the cargo containers on the supporting platform 32. To release the locking arrangement, it will be noted that a pivotally mounted handle 78 (FIG. 4) provided on a longitudinal end of the supporting platform 32 can be manipulated so as to slide the slide lock member 70 in the opposite longitudinal direction (aft) so that a lower flapper portion 62b can move, under the influence of the torsion springs 66, into the recess 74. In this manner, the cargo containers can be removed easily since the pivotal flapper member 62 can be moved or rotated in the opposite direction under the influence of the container overcoming the bias of the springs 66 and rotating into the opening 68. Other mechanisms besides pivoting handles are envisioned for use in sliding the slide member 70 between the locking and unlocking position. The handle 78 in this embodiment has its end connected to the slide member 70 and the pivot point is located above the slide lock member.

While the foregoing describes one embodiment of the present invention, it will be recognized that the movement of the sliding member 70 can be done by a fluid motor or by other suitable motion producing devices. Likewise, the flapper member can be raised or lowered by other suitable mechanisms. Also, while a plurality of flappers have been shown, it will be appreciated that a single flapper may be used instead.

It will be appreciated that there can be several changes to the foregoing construction and yet still be within the spirit and scope of the present invention. For example, the fluid motors can be replaced with electric motors, the chassis assembly can have a variety of sizes and shapes. Although the present embodiment describes a vehicle that is towed, it will be appreciated that there can be provided a vehicle mechanism which is self-powered.

Certain changes may be made in the above described cargo vehicle without departing from the scope of the present invention. For example, the present invention can be used for carrying a variety of different loads. It is, therefore, intended that the matter contain in the description above and shown in the accompanying drawings shall be interpreted as illustrative and not in any limiting sense.

What is claimed is:

1. A wheeled cargo vehicle for facilitating the loading and unloading of cargo containers from one location to another location, said apparatus comprising:

a wheeled frame means;

a chassis assembly having a first end and a second end supported by and for vertical movement relative to said frame means between at least a lower ground engaging position, at which the containers are easily loaded/unloaded onto and from, and an upper transporting position at which the containers are supported off the ground for transportation by said vehicle;

said frame means including reciprocal fork lifting means connected to said first end of said chassis assembly and being operable for raising and lowering said chassis assembly in a straight line path between said positions; and, support means pivotally attached to said second end of said chassis assembly and including a rear axle wheel assembly, said support means being operable in one position for supporting said chassis assembly in said upper position and movable to a second position for allowing said chassis assembly to move to said lower position, whereby the containers can be easily loaded onto and unloaded therefrom; wherein, said rear axle wheel assembly is pivotally connected to said chassis assembly and said support means includes a pivoting arm which is movable between a first position which corresponds to said upper transporting position of said chassis assembly and a second position which corresponds to said lower ground engaging position of said chassis assembly; and motor means connected to said pivoting arm and said chassis assembly and being operable to selectively drive said pivoting arm between said first and second positions.

2. The cargo vehicle of claim 1 wherein said chassis assembly is open-sided and accessible along at least one longitudinal side thereof, and includes a generally horizontal surface upon which the containers are supported, and said chassis assembly includes truss means for providing structural support for the containers mounted on said chassis assembly.

3. The cargo vehicle of claim 1 wherein said frame means includes attaching means for attachment of said vehicle to a towing vehicle so as to allow movement of said cargo vehicle.

4. The cargo vehicle of claim 1 wherein there is provided at least a releasable cargo container locking and releasing mechanism on said chassis assembly and which is operable for releasably retaining cargo containers on said chassis assembly.

5. The cargo mechanism of claim 4 wherein said locking and releasing mechanism includes at least a single flapper which is biased to extend upwardly by biasing means, said biasing means for interconnecting said flapper with said chassis assembly and allowing said flapper to rotate through an opening formed in said chassis assembly when engaged on either side thereof by a cargo container; and a locking assembly movable between locking and unlocking conditions wherein when in said locking condition said locking assembly engages a bottom portion of said flapper protruding through said opening so that an upper portion of said flapper is in a locked relationship to retain cargo containers on said chassis assembly, and when in said unlocking condition allows said flapper to move therepast into a non-locking condition and permit movement of cargo containers therepast.

6. A wheeled cargo vehicle for facilitating the loading and unloading of cargo containers from one location to another location, said apparatus comprising:

a wheeled frame means;

a chassis assembly having a first end and a second end supported by and for vertical movement relative to said frame means between at least a lower ground engaging position, at which the containers are easily loaded/unloaded onto and from, and an upper transporting position at which the containers are supported off the ground for transportation by said vehicle;

said frame means including fork lifting means connected to said first end of said chassis assembly and being operable for raising and lowering said chassis assembly between said positions; and, support means pivotally attached to said second end of said chassis assembly and including a rear axle wheel assembly, said support means being operable in one position for supporting said chassis assembly in said upper position and movable to a second position for allowing said chassis assembly to move to said lower position, whereby the containers can be easily loaded onto and unloaded therefrom, there is provided at least a releasable cargo container locking and releasing mechanism on said chassis assembly and which is operable for releasably retaining cargo containers on said chassis assembly;

said locking and releasing mechanism includes a plurality of flapper each of which is biased to extend upwardly by biasing means, said biasing means for interconnecting each said flapper with said chassis assembly and allowing each said flapper to rotate through an opening formed in said chassis assembly when engaged on either side thereof by a cargo container; and a locking assembly movable between locking and unlocking conditions wherein when in said locking condition said locking assembly engages a bottom portion of a said flapper protruding through said opening so that an upper portion of a said flapper is in a locked relationship to retain cargo containers on said chassis assembly, and when in said unlocking condition allows a said flapper to move therepast into a non-locking condition and permit movement of cargo containers therepast;

said locking assembly includes a recess which permits free movement of said bottom portion of a said flapper therepast when in said unlocking position.

7. A wheeled cargo vehicle for facilitating the loading and unloading of cargo containers from one location to another location, said apparatus comprising:

a wheeled frame means;

a chassis assembly having a first end and a second end supported by and for vertical movement relative to said frame means between at least a lower ground engaging position, at which the containers are easily loaded/unloaded onto and from, and an upper transporting position at which the containers are supported off the ground for transportation by said vehicle;

said frame means including reciprocal fork lifting means connected to said first end of said chassis assembly and being operable for raising and lowering said chassis assembly in a straight line path between said positions; and, support means pivotally attached to said second end of said chassis assembly and including a rear axle wheel assembly, said support means being operable in one position for supporting said chassis assembly in said upper position and movable to a second position for allowing said chassis assembly to move to said lower position, whereby the containers can be easily loaded onto and unloaded therefrom, said locking and releasing mechanism includes a plurality of flappers, each of which is biased to extend upwardly by biasing means, said biasing means for interconnecting each said flapper with said chassis assembly and allowing each said flapper to rotate through an opening formed in said chassis assembly when engaged on either side thereof by a cargo container; and a locking assembly movable between locking and unlocking conditions wherein when in said locking condition said locking assembly engages a bottom portion of a said flapper protruding through said opening so that an upper portion of a said flapper is in a locked relationship to retain cargo containers on said chassis assembly, and when in said unlocking condition allows a said flapper to move therepast into a non-locking condition and permit movement of cargo containers therepast.

* * * * *